(12) United States Patent
Neely (10) Patent No.: US 7,504,361 B2
(45) Date of Patent: Mar. 17, 2009

(54) GLASS PANELING WITH A SUBLIMATED IMAGE AND PROCESS FOR MAKING THE SAME

(76) Inventor: Richard A. Neely, 795 Bellwood Hollow Rd., Indian Mound, TN (US) 37079

( * ) Notice: Subject to any disclaimer, the term of this patent is extended or adjusted under 35 U.S.C. 154(b) by 269 days.

(21) Appl. No.: 11/447,266

(22) Filed: Jun. 6, 2006

(65) Prior Publication Data

US 2006/0240982 A1    Oct. 26, 2006

Related U.S. Application Data

(63) Continuation-in-part of application No. 10/860,083, filed on Jun. 3, 2004.

(51) Int. Cl.
  *B41M 5/035* (2006.01)
  *B41M 5/382* (2006.01)
(52) U.S. Cl. ..................... 503/227; 428/210
(58) Field of Classification Search ............... None
  See application file for complete search history.

(56) References Cited

U.S. PATENT DOCUMENTS

| | | | |
|---|---|---|---|
| 4,232,076 A | 11/1980 | Stetson et al. | |
| 4,452,604 A | 6/1984 | Lenox et al. | |
| 4,478,909 A * | 10/1984 | Taniguchi et al. | 428/331 |
| 5,188,876 A | 2/1993 | Hensel et al. | |
| 5,234,983 A | 8/1993 | Valenty | |
| 5,981,112 A | 11/1999 | Roberts | |
| 6,000,793 A | 12/1999 | Inamoto | |
| 6,025,023 A | 2/2000 | Valente et al. | |
| 6,265,029 B1 | 7/2001 | Lewis | |
| 6,332,941 B1 | 12/2001 | Council et al. | |
| 6,336,723 B1 | 1/2002 | Nicolin | |
| 6,482,285 B2 | 11/2002 | Cross | |
| 6,487,386 B1 | 11/2002 | Zimmer et al. | |
| 6,773,104 B2 * | 8/2004 | Cornelius et al. | 347/106 |
| 6,824,936 B1 * | 11/2004 | Rosiek et al. | 430/17 |
| 6,832,832 B2 | 12/2004 | Martin et al. | |
| 2005/0239004 A1 | 10/2005 | Gahler et al. | |

OTHER PUBLICATIONS

Whitehill, Paul, "So You Want to Make Tile Murals", Sublimation Almanac, 2004, pp. 36-42.
A & E Magazine, Jun. 2004, p. 62.
"Custom Floor Tile Murals", 2004.
Images In Tile, LLC, "an innovative canvas" brochure.
Adams, Jennifer, "Creating Lasting Impressions in Title", Tile Magazine, Jan./Feb. 2005, pp. 18-20, 22, vol. 2, No. 1.
"Conde' to Carry Bison Coating's Porcelain, Ceramic and Glass Tiles", Grapchics Pro, Aug. 2005.

* cited by examiner

*Primary Examiner*—Bruce H Hess
(74) *Attorney, Agent, or Firm*—Cahn & Samuels, LLP (57) ABSTRACT

Disclosed herein is a glass sheet substrate and process for making the same with a first wear surface, an obverse, second surface including a thermoset image receiving coating having a complete, unitary sublimated ink image that is viewable with minimal loss of resolution and clarity from the first side through the thickness of the glass sheet substrate.

17 Claims, 6 Drawing Sheets

GLASS PANELING WITH A SUBLIMATED IMAGE AND PROCESS FOR MAKING THE SAME

RELATED APPLICATIONS

This is a continuation-in-part application of Ser. No. 10/860,083 filed Jun. 3, 2004.

FIELD OF THE INVENTION

This invention relates generally to glass sheets having a complete image formed on the surface. More particularly, the current invention relates to multicolored-imaged glass sheets and a process for making the same where the glass sheets are of sufficient dimensions to accommodate an entire image, to provide sublimated, multi-colored images, to maintain integrity and stability of the image in ambient conditions. Such glass sheets may be used in structural contexts such as doors, windows, or flooring, or non-structurally, such as decorative wall panels, room dividers and the like, which permit visual access of the high resolution sublimated images through the glass sheets.

BACKGROUND OF THE INVENTION

It is known in the art to place images on substrates, such as floors, walls doors, non-structural panels, furniture and the like. It is also known in the art to use sublimation to place these images onto these substrates. However, conventional processes and techniques require placement of the sublimated image on the exposed, wear surface of the structural member, such as an upper floor surface or a utility surface of a table top. Also, conventional techniques rely on materials such as laminated plastics which have a tendency to deform as a result of relatively lesser hardness and rigidity and, consequently, become scratched and disfigured. To overcome such issues, it is conventional to coat the images and substrates with a protective layer in an attempt to enhance the wearability and longevity of the images.

For example, U.S. Pat. Nos. 4,452,604, 5,188,876, 4,232,076, 6,025,023, 6,482,285, 6,000,793, and 6,332,941 all disclose various known techniques of placing an image on an exposed, wear surface. Typically colored coated materials according to these teachings take the form of small pieces or tiles which are assembled into a desired mosaic pattern that must be laid down and affixed with considerable labor and effort. Moreover, gaps between abutting pieces must be filled with a water resistant sealant which adversely impacts the aesthetics of the overall image quality.

The above referenced art suffers from several additional shortcomings. For example, a color image imprinted or coated on an exposed exterior/wear surface which may or may not be covered by a protective coating typically degrades over time and differentially erodes due to exposure to ambient conditions and erosive forces, e.g., foot traffic, dropped utensils, etc. Materials selected as the substrate or carrier of the image, most typically plastics, whether coated or not with an abrasion-resistant layer, and even metals and ceramics, have a tendency to wear, deform, scratch, and generally degrade. Also, where the prior art suggests or teaches placement of an image on an exposed wear surface intended for user contact, it follows naturally that the imaged substrate surface will be exposed to a greater amount of distress/abrasion/trauma. Even combining teachings from the prior art to address wear/erosion/traffic damage merely leads to the use of protective layers and or laminations, while perhaps serving to enhance image longevity, also cause degradation and/or distortion of image resolution.

Relatively more expensive interior glass laser etching techniques have been suggested as a means to maximize image preservation by effectively imbedding the image in the glass sheet. However, such techniques are limited essentially to monochromatic representations and require expensive equipment and precise control. Other known art discloses alternative techniques for producing, for example, pixilated arrays on glass surfaces. One such multi-step process, described in U.S. Pat. No. 5,981,112, contemplates repeated use of lift off procedures, mechanical/chemical polishing, and/or close space sublimation/etching processes for each color.

Still other known art is directed to alternative approaches for multicolor image generation on glass. For example, U.S. Pat. No. 6,336,723 describes generating a computer-controlled printer image on relatively large sheets of glass. The process relies on light-fast inks (e.g., glass sintered powders with pigments/enamels) directly applied to a glass sheet which is then fired at in excess of 450° C.

Additional teachings relating to the manufacture of simulated stained glass are identified in Sikorski, U.S. Pat. No. 6,357,103, which relies on adhering a laser printed, imaged/colored polyester film to glass with resin, preferably an epoxy.

To imprint vanity/custom images, photographs, children's art work, etc., by sublimation onto relatively small ceramic surfaces, e.g., coffee mugs, plates, etc., is now well known. An effective sublimation-transfer receptor-surface coating and technique is described in Valenty, U.S. Pat. No. 5,234,983. This coating, Thermoglaze 2000 complies with the FDA guideline for food contact ceramic coatings. Thermaglaze 2000 is recognized for providing hard, durable, scratch resistant, coatings that protect the integrity of underlying images on the ceramic surface.

What is needed then is a new type of substrate imaging technique that provides a long lasting, multicolored image of high resolution and clarity of on generally transparent surfaces even when exposed to substantial wear forces. The same is equally desirable in a form that results in the formation of a sublimated image that is viewable in a desired direction yet is protected from exposure, wear and traffic, such as on a floor, table top, or door.

SUMMARY OF THE INVENTION

It is, therefore, an object of the present invention to address and overcome the above-referenced problems with sublimated, multi-colored image structures, apparatus, and methods.

It is another object of this invention to provide a highly efficient and efficacious system for creating large, single-sheet decorative glass that can be produced relatively inexpensively, with a minimum of labor and that possesses enhanced longevity.

Another object of this invention is to provide a glass sheet having a sublimated image positioned on the opposite/obverse of the wear surface on a generally transparent unitary glass sheet dimensioned to accommodate an entire multi-colored image.

Still another object of the present invention is to provide a transparent substrate having a properly orientated image such that the entire image is viewable through the glass sheet.

A further object of the present invention is to provide a floor having a glass section with a sublimated image positioned underneath the glass flooring section such that the image is viewable through the glass flooring section to one walking on the floor.

Yet another object of the present invention is to provide a door for a bath or shower enclosure formed of a single glass section with a sublimated image on the door surface so as to be readily viewable but also to restrict visual access to the interior of the enclosure.

A further object of this invention is to permit production of a rugged glass panel bearing a sublimated, customized, truthfully reproduced, image of any desired subject matter ranging from company indicia to family photographs on the obverse of the wear/exposed panel surface.

These and other objects are satisfied by a generally transparent and substantially clear glass sheet substrate comprising a first surface and second obverse surface, dimensioned to receive an entire imprinted image, said first and second surfaces being spaced apart by the thickness of the substrate in a manner not to degrade resolution of a sublimated image viewed therethrough, and an image positioned on the second surface and viewable from the first surface through the glass sheet. The glass substrate is preferably in the form of a single sheet dimensioned to receive the entirety of a multi-colored image which is applied in a single application. The resulting multi-colored glass provides clear viewing clarity of a crisp image without loss of resolution, degradation, or distortion.

Exemplary uses of these glass sheets include floors and floor sections, walls, doors, and bathroom placement. Additionally the glass sheets can be used as architectural, structural and decorative panels in and around swimming pools. The invention also contemplates use as kitchen countertops.

The glass sheets are of a commercial grade and can combine to fill commercial applications on floors, walls, countertops, swimming pools, back splashes in kitchens, and the like. Placing the images on the non-wear surface of the glass sheets overcomes longstanding problems, i.e., namely, the ability to perceive the image without distortion or degradation and still maintain a high level of durability of the image on a floor or other exteriorly exposed surface.

The invention also contemplates a new use of a known coating which is described in Lewis, U.S. Pat. No. 6,265,029, the content of which is incorporated herein by reference in its entirety. That coating is commercially available under the name "Satin Hardcoat" from California Hardcoating Company of Chula Vista, Calif. Applying this preferred coating compounded with other constituents described herein coupled with large-format multi-colored images on a unitary glass substrate sheet under controlled temperature, humidity, and environmental conditions provides a product satisfying objectives of the invention.

As used herein "transparent" is directed to the opacity characteristic of the glass and in generally intended to connote minimal scatter of light passing therethrough. "Clear" as used herein is directed to the color of the glass, i.e., clear glass is colorless.

As used herein "substantially," "generally," and other words of degree are relative modifiers intended to indicate permissible variation from the characteristic so modified. Such descriptive words are not intended to be limited to the absolute value or characteristic which they modify but rather as possessing more of the physical or functional characteristic than their opposite, and preferably, approaching or approximating such a physical or functional characteristic.

In the following description, reference is made to the accompanying drawing, which is shown by way of illustration to the specific embodiments in which the invention may be practiced. The following illustrated embodiments are described in sufficient detail to enable those skilled in the art to practice the invention. It is to be understood that other embodiments may be utilized and that structural changes based on presently known structural and/or functional equivalents may be made without departing from the scope of the invention.

DETAILED DESCRIPTION OF THE DRAWINGS

Referring generally now to FIGS. 1-6, a glass sheet substrate made in accordance with the current invention is generally shown and designated by the numeral (10). The glass sheet comprises a first, exposed or wear surface (12), a second oppositely facing (obverse) non-wear surface (14), a thickness (16), and a sublimated image (18) formed on the second surface (14).

The image (18) is positioned such that a viewer (not shown) of the glass sheet (10) is able to view and comprehend the image (18) when viewing the glass sheet (10) from the first surface (12). The image (18) is viewable without distortion or degradation through the thickness (16) of the glass sheet (10).

Figure 1:
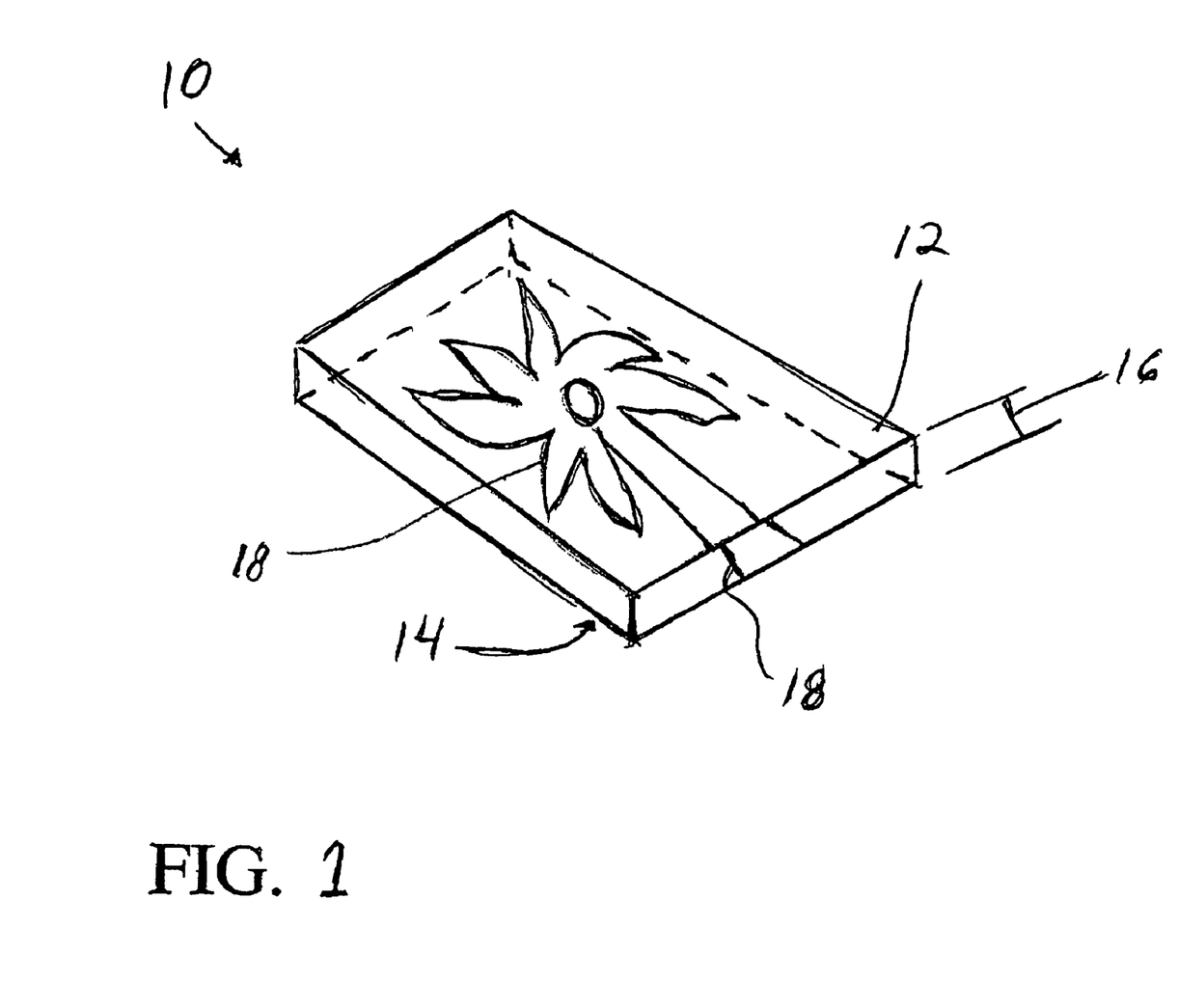
FIG. 1 illustrates one embodiment of a glass sheet of exaggerated thickness providing a unitary substrate dimensioned to receive an entire sublimated image in accordance with the current invention.
Figure 2A:
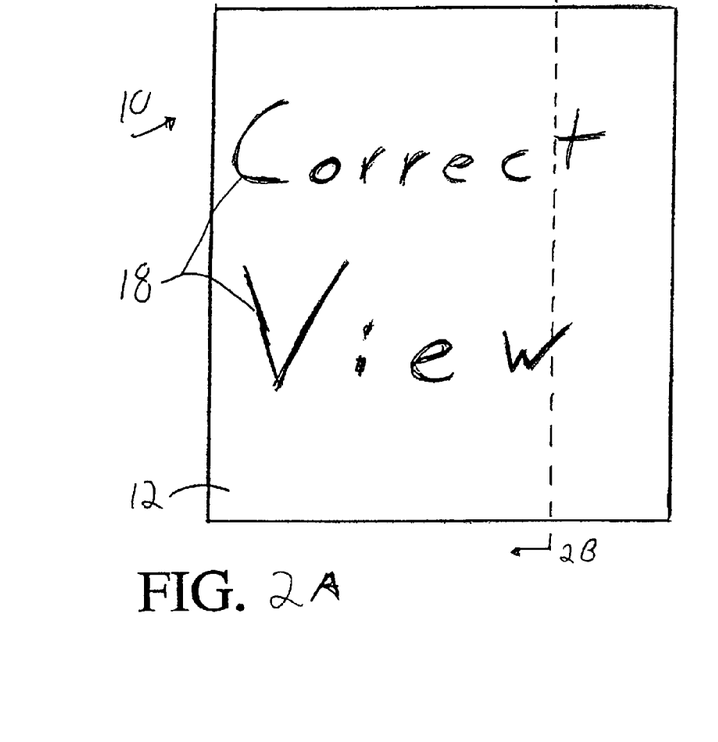
FIG. 2(a) shows a front view of an embodiment of a glass sheet in accordance with the current invention.

The image (18) is sublimated onto the second surface (14) in accordance with the process described herein. The sublimated image (18) is orientated and positioned on the second surface (14) such that it is properly viewable through the thickness (16), as best illustrated in FIGS. 2(a)-2(c).

In a preferred embodiment the glass sheet substrate (10) is a boundary for a washing facility (26). For example, the washing facility (26) can be a shower stall, shower door, bath wall, bath floor, bath tub, in a bathroom, and the like. The glass sheet can also be attached to a wall as an accent or decorative panel wherein the second surface (14) is affixed to the wall such that the image (18) is protected from the environment in which the wall is located.

Figure 2B:
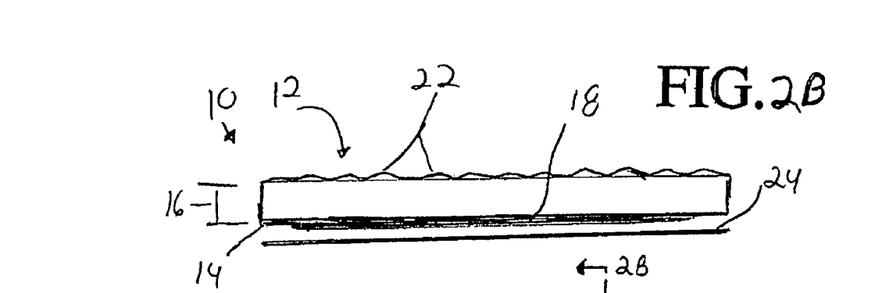
FIG. 2(b) shows a cross-sectional view of FIG. 2(a) along line 2(b)-2(b).
Figure 2C:
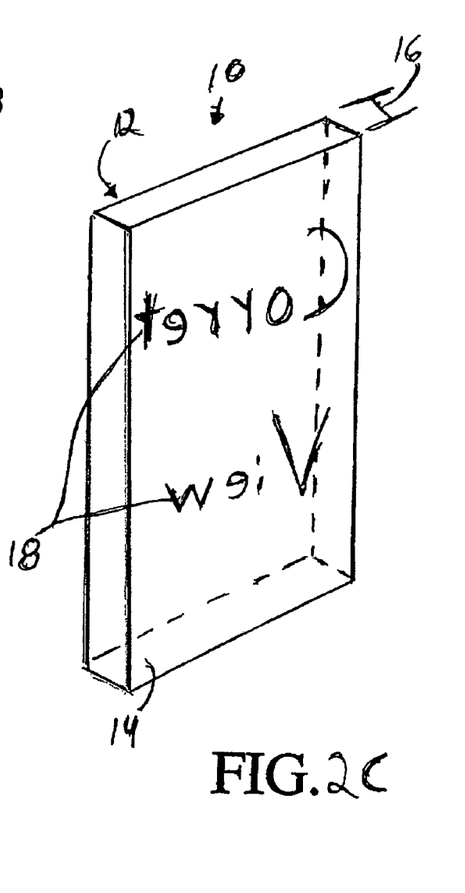
FIG. 2(c) shows a back perspective view of the glass sheet embodiment shown in FIG. 2(a).

FIG. 2(b) illustrates the cross-sectional view of a panel particularly suited for flooring. In FIG. 2(c), the wear surface (12) includes surface texturing (22) preferably formed integrally during manufacture of the glass but may be formed later using by one of many available, appropriate clear, transparent, non-image degrading coatings. Preferably, as a result of the texturing, the wear surface (12) possesses a coefficient of friction greater than 0.40 to facilitate locomotion/walking. Additionally, the glass section (10) may include a backing coating or material (24) sandwiching the sublimated image and the second glass surface (14). The purpose of this coating is to improve image contrast and, therefore, visibility of the sublimated image (18). This backing material is preferably white in order to enhance the image (18).

Figure 3:
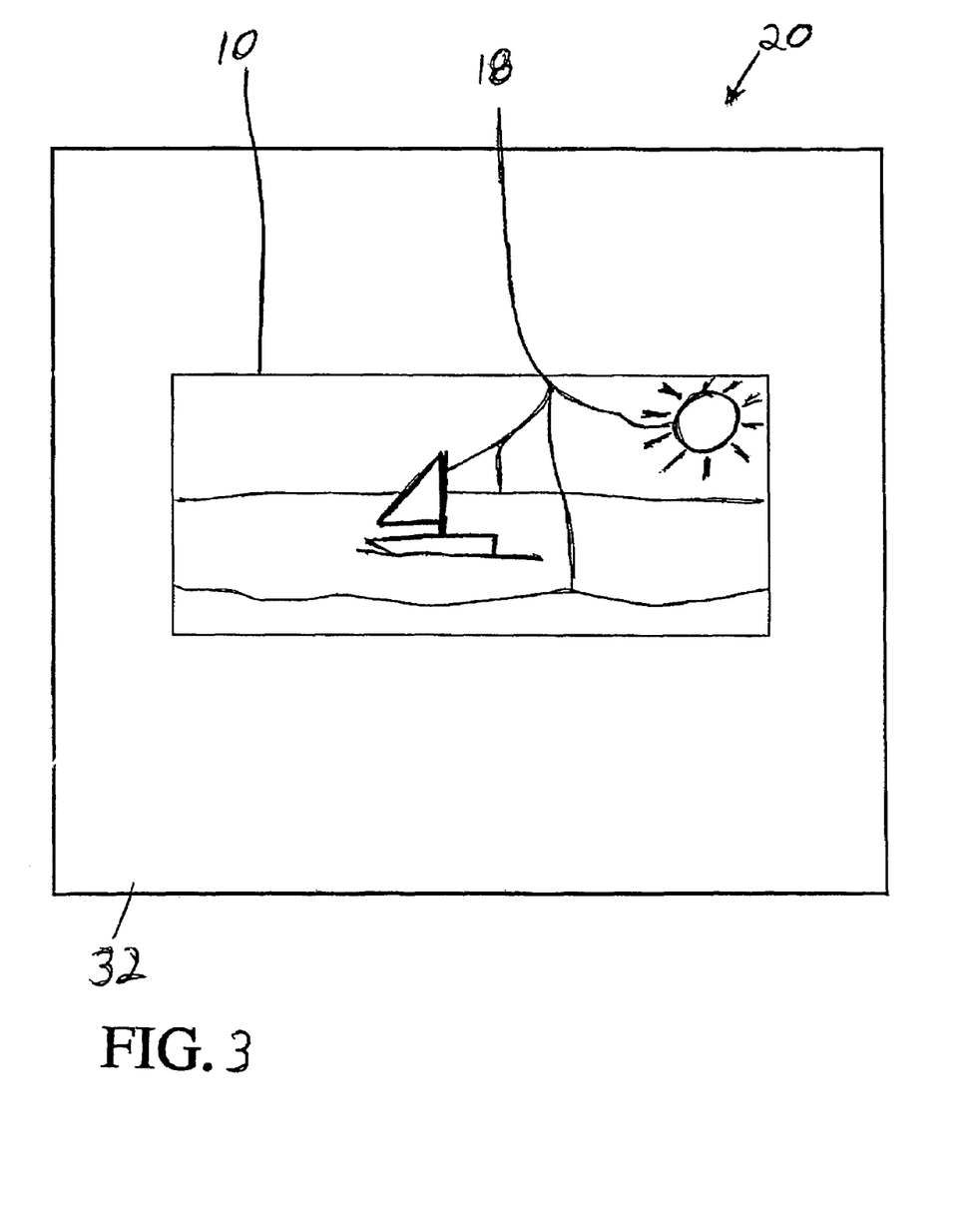
FIG. 3 shows a front view of an embodiment of a tabletop made in accordance with the current invention.
Figure 4:
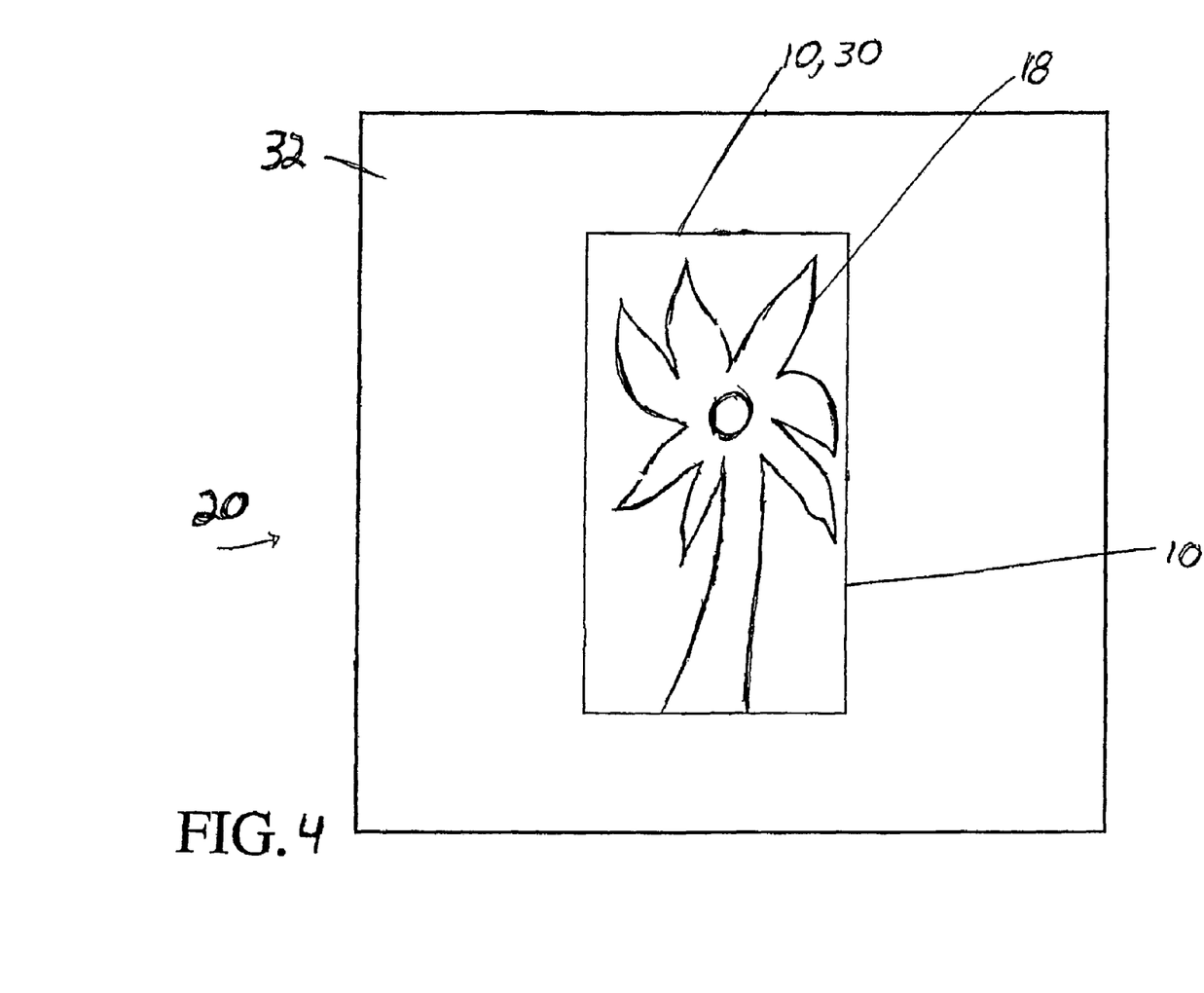
FIG. 4 shows an alternate embodiment of a floor made in accordance with the current invention having to provide an image.
Figure 5:
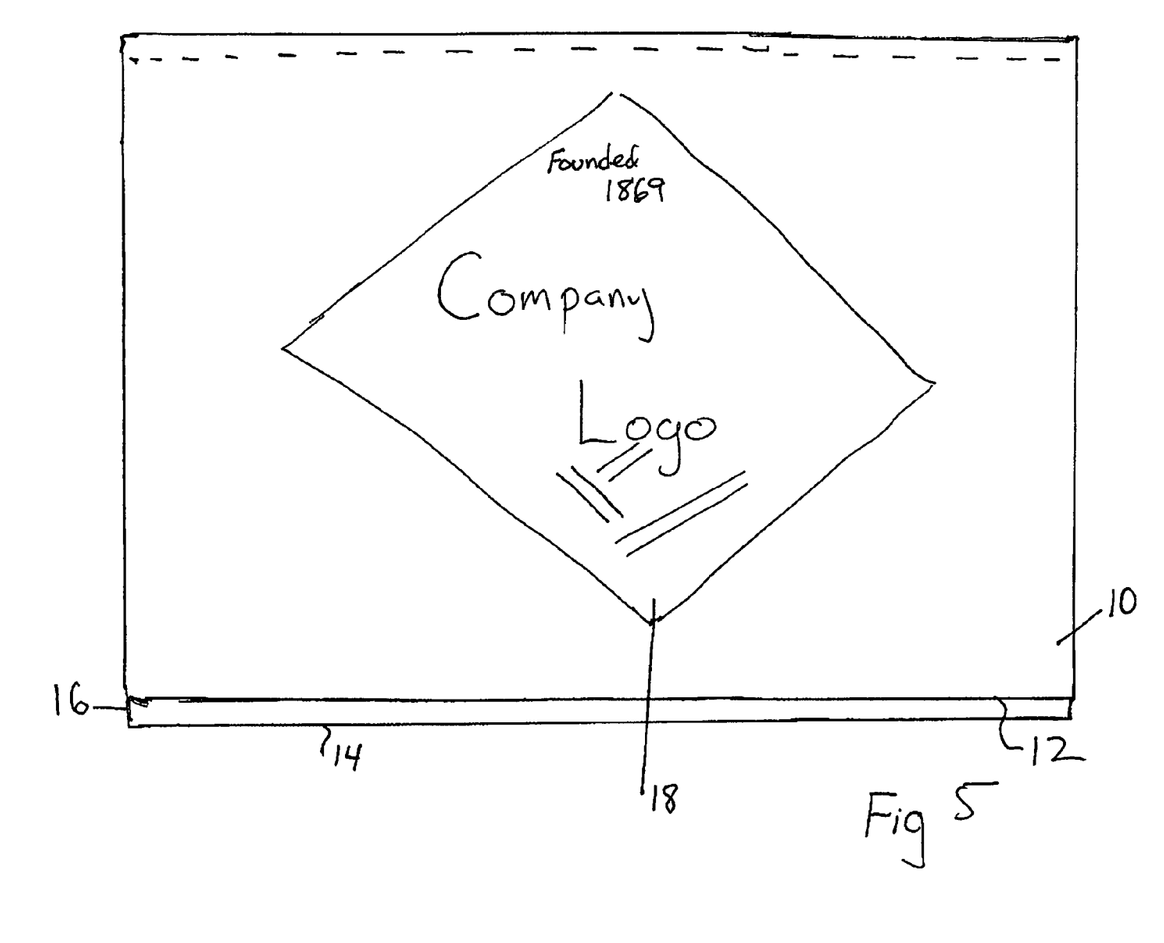
FIG. 5 shows an example of a glass floor made in accordance with the current invention.

FIGS. 3, 4, and 5 represent decorative floor paneling sheets in accordance with the invention. In these embodiments, preferably, the floor (20) does not include an abrasion or wear-resistant layer or coating disposed on the wear surface (12) to avoid degradation of the image viewing but includes the non-image degrading friction enhancing layer (22). Ideally, the invention dispenses with the need for the wear-resistant layer due to the inherent hardness and scratch-resistance of the glass itself as well as the fact that the sublimated image (18) is formed on the opposite, non-wear side (14).

Additionally, the sublimated image on the proximately positioned glass section (10) provides an uninterrupted, unitary image that may incorporate a decorative framing/border/boundary (32) comprised of other materials providing strength and structure to the glass floor (30). As illustrated in FIG. 5, the invention contemplates an attractive, customized flooring panel for an entryway that features a large-format company name/logo or other desired information.

Figure 6:
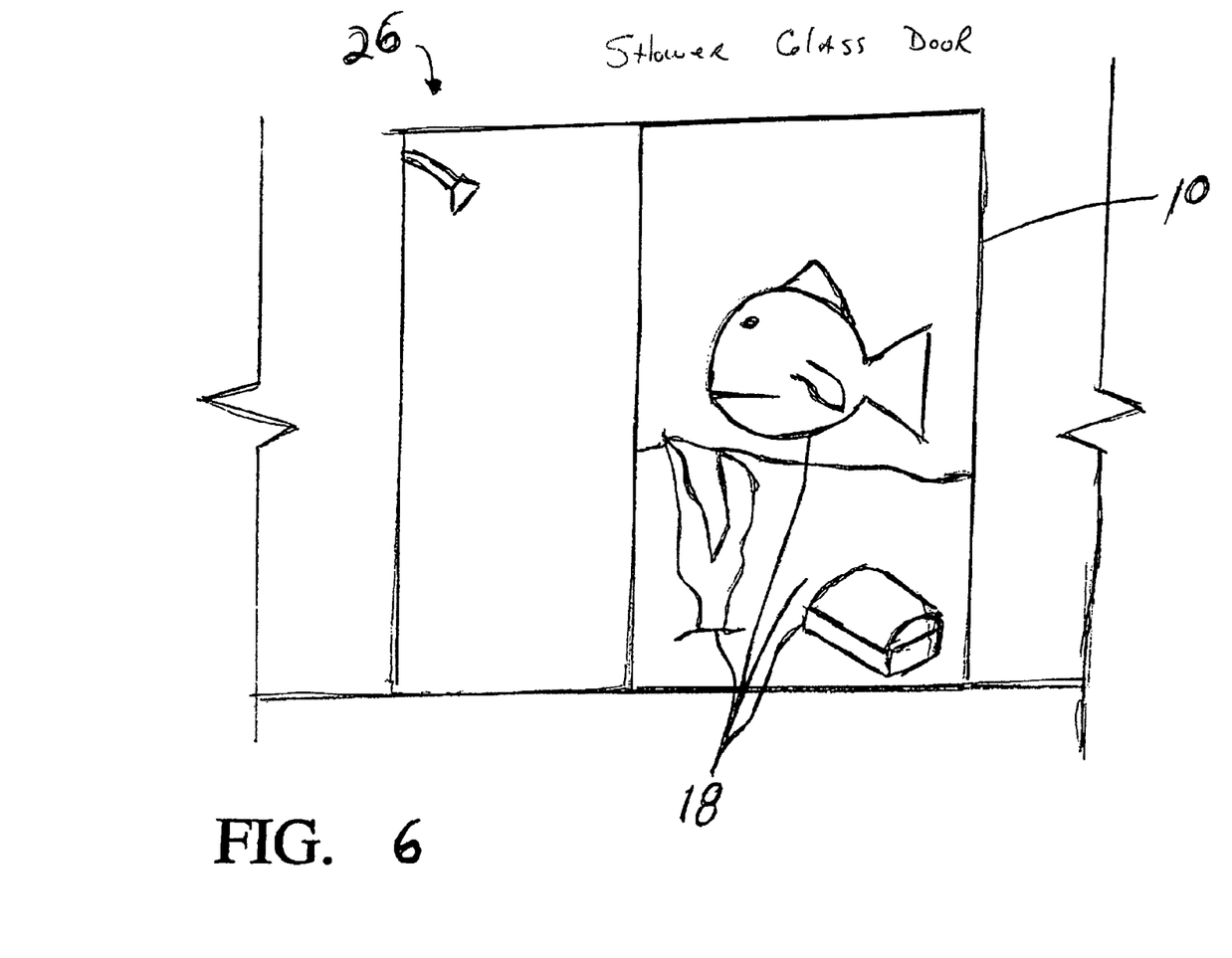
FIG. 6 shows an example of a glass sheet made in accordance with the current invention used as a bath boundary.

As a final illustration of potential applications of the invention in a household context, FIG. 6 depicts a shower stall (26) including a unitary, single imaged door panel (10). In one embodiment, the multi-colored image also serves as a privacy screen for an occupant of the shower, particularly when the sublimated image is formed in connection with the below-described high-contrast coating.

Details of preferred components for use in connection with the invention are now described. Preferably, the glass used herein is tempered, that is pre-stressed, and may even be safety glass. The glass may be formulated using known additives to enhance desirable physical properties such as breakage resistance, UV light degradation resistance, etc. Preferably, the glass substrate sheet (10) has a thickness of at least 0.25 in (6.3 mm) but may have a greater thickness depending on the intended use. As a practical matter, the thicker the glass sheet, the heavier it is and the more costly. However, in the context of this invention, so long as the optical properties of the glass composition do not interfere or degrade the image being viewed through the glass sheet, the thickness is not limited.

In the context of architectural/structural applications, preferably the glass used as the glass substrates/sheets (10), preferably meets ANSI and ASTM standards for commercial wall and floor applications. The glass preferably exhibits properties adequate to meet the following standards that comply with those established for ceramic tile flooring by the Tile Council of America:

| | | |
|---|---|---|
| a. ASTM C1026: | Freeze-Thaw | |
| | Tiles showed no evidence of freeze-thaw damage after completing 15 cycles of freeze-thaw. | |
| b. ASTM C1028: | Static Coefficient of Friction | |
| | Dry = 0.86 | |
| | Wet = 0.52 | |
| c. ASTM C373: | Water Absorption Rate | |
| | 0.37% = impervious | |
| d. ASTM C650: | Resistance to Chemical Substances | |
| | Not affected by the following: Acetic acid 3% & 10%; Ammonium chloride, 100 g/L; Citric acid solution, 30 g/L & 100 g/L; Lactic acid, 5%; Phosphoric acid, 10%; sulfamic acid, 3% & 10%; Swimming Pool Chemicals = Sodium hypochlorite solution, 20 mg/L; Acids & Bases = Hydrochloric acid solution, 3% & 18%; Potassium hydroxide, 30 g/L & 100 g/L | |

| | | |
|---|---|---|
| | -continued | |
| e. ASTM C485: | Warpage of Tile | |
| | Edge warpage: −.02%; | |
| | Diagonal, warpage: 0.00% | |
| f. ASTM C499: | Dimensional Variation | |
| | Facial dimensions and thickness of tile | |
| | Average difference of 0.020 inches | |
| g. ASTM C502: | Wedging of Tile | |
| | Average percent wedging was 0.03% | |
| h. ASTM C648: | Breaking Strength | |
| | Average breaking strength is 1931 lbf | |
| i. Mohs Scratch Hardness | 5 (1-talc to 10-diamond) | |

Such glass sheets possess the physical characteristics necessary to meet basic requirements as use for flooring. The substrate may also be formed from known silicate-based glass substitutes such as polycarbonate glass but at an understandably greater cost.

The preferred coating for use in the context of this invention is a mixture of a liquid thermosettable, condensation co-polymerized acidic-colloidal silica sol and the like with monomethyltrimethoxysilanes (Satin Hard Coat) with blocked polyisocyanate/polyurethane epoxy resins (Thermoglaze 2000 from Analyze, Inc. of Chandler, Ariz.). The preferred mixture is a 3 to 1 ratio of Thermoglaze to Satin Hard Coat. The resulting coating provides an excellent color-sublimation medium that adheres strongly to the substrate and provides a water-proof, abrasion-resistant surface. Satin Hard Coat is fully described in U.S. Pat. No. 6,265,029, which, as indicated above, is incorporated by reference herein. ThermoGlaze 2000 is described in Valenty, U.S. Pat. No. 5,234,983, the content of which is also incorporated by reference herein.

The Satin Hard Coat mixture may be applied by conventional application techniques such as roller coating, spray coating, curtain coating and the like. Preferably, the resulting layer has a thickness of approximately 2 mil and is allowed to cure in an oven for about 15 minutes at a temperature of 390° F. (199° C.). Preferably, the entire coated substrate is heated at the same time in a large oven, but the invention also contemplates use of a conveyor oven where the sheets move into and out from the temperature controlled oven at a selected rate.

The curing conditions optimally are conducted in a low-humidity, substantially dust-free environment where the temperature changes are gradual. In one exemplary arrangement, an automatic conveyor transports the coated glass sheets over a long path which essentially comprises three distinct segments: a temperature ramp-up segment, a thermal curing segment, and a cool-down segment. In the case of a 100 ft (30 m) line, the ramp-up segment is about 30 feet (9.1 m) where the temperature ramps up slowly from ambient to 400° F. (204° C.) in a period of 20 minutes. The first 10 feet (3 m) of the ramp-up segment is not heated to give the coating a chance to flash at temperatures at ambient and above. As the conveyor moves the coated substrate further into the heat tunnel, and into the thermal curing segment, the temperatures increase gradually over every 5 feet (1.5 m) to provide an opportunity for solvents within the coating to differentially flash. For example, where the temperature is increased 50° F. (28° C.) degrees every 5 feet: (1.5 m) commencing at ambient ~77° F. (25° C.), 125° F. (52° C.), 175° F. (80° C.), 225° F. (107° C.), 275° F. (135° C.), 325° F. (163° C.), 375° F. (190° C.) and to then 400(204° C.) in the last oven segment of 10 feet (3 m) before exiting to the cool down segment. The cool-down segment incorporates cooling fans to advance temperature reduction to ambient (room temperature). While not limited to particular equipment, the practice of the invention contemplates utilization of a continuous conveyor providing for coating of the glass sheet substrate with the sheet heating and cooling via large conveyor systems of a length of up to up 150 feet (45.7 m) and including heat tunnels having a width of at least 4 feet (1.2 m) in order to meet the requirements for continuous large scale processing contemplated by the invention.

After cooling to ambient temperature, preferably within about 20 minutes, by use of fans the satin finish coating is ready to accept an image. Application to the now-cured coated substrate of appropriate image-generating paints/dyes for sublimation may be accomplished using conventional, known methods, e.g., hand painting, silk screening, airbrush spraying, laser printing, dye sublimation carrier media, etc.

If it is desirable to produce an image having a greater visible contrast rather than a satin/matt type finish appearance, the above-described cured Satin Hard Coat coating may be substituted by a Thermoglaze-Silane mixture. That mixture is a 5:1 ratio of the Thermoglaze to an amino silane such as Silquest 1110 available from GE Silicones of Danbury, Conn., which is applied to the substrate as above but cured at a slightly lesser temperature (380° F./194° C.). After cooling, a further coating is applied which is composed of a termixture of Thermaglaze 2000, Satin Hard Coat, and Powdered Titanium Dioxide ($TiO_2$) in a 20:5:2 weight ratio. That termixture is applied in a similar fashion to the above-described satin finish coating, i.e., by spray, roller, or curtain coating to a thickness of 2 mils which is cured for 15 minutes at the temperature of 380° F. (194° C.). After cooling, the substrate with the high-contrast white backing coating is then imprinted for sublimation.

Also this invention contemplates addition to the Satin hard Coat coating of effective amounts of desirable heat stable agents such as antifungal and antibacterial additives to the coating mixture. For example, adding a small amount of a fungicide in the context of high-humidity/bathroom use provides resistance to mold growth. For example, in the context of non-food use, adding a small amount (e.g., 1 gm/4 liters) of the thiazolyl substituted benzimidazole antifungal agent Metasol TK-100 (Lanxess), does not adversely impact the coating characteristics of the Satin Hard Coat compositions and enhances antifungal capability.

The foregoing describes the process for preparing the substrate for receiving the multi-colored image. To that end, the sublimation inks/dyes preferred for use in connection with creation of the image contemplated by this invention are conventional sublimation dyes/inks available from Sawgrass Technologies, Inc. of Mount Pleasant, S.C., such as those, for example, described in connection with the process disclosed in U.S. Pat. No. 5,488,907 and available under the mark Sublijet®. Images may be selected from sources ranging from professional image catalogs including reproductions of famous masterpieces, images of historical figures and documents, images of animated characters, original works of corporate graphic arts, to personal digital family photographs and personal artwork. Preferably, to maximize accurate and truthful reproduction, the image is achieved computer technology and more particularly, using a dot matrix printer or laser type printer charged with the above described sublimatable inks.

Alternatives to the forgoing should be readily apparent. For example, the substrate need not be a conventional flat sheet but may be curved, convex, or concave. Consistent with objectives of the invention, a complete sublimated image may be formed on a select surface of the non-flat surface by may require application of the coating and image ink by hand/spraying rather than a preferred, automated process.

Given the foregoing, it should be apparent that the specifically described embodiments are illustrative and not intended to be limiting. Furthermore, variations and modifications to the invention should now be apparent to a person having ordinary skill in the art. These variations and modifications are intended to fall within the scope and spirit of the invention as defined by the following claims.

I claim:

1. A custom imaged glass panel, comprising:
   a generally transparent glass sheet substrate comprising a first surface, and second, oppositely facing surface defining a surface area dimensioned to receive an entire sublimated image, said first and second surfaces being spaced apart by the thickness of the substrate selected to minimize image resolution degradation;
   an image receiving coating on said second surface formed from liquid thermosettable silica sols, silanes, polyurethanes, and epoxy resins where the image receiving coating sol is a condensation co-polymerized acidic-colloidal silica sol and the image receiving coating has a thickness of 2 mils and the first surface of said glass sheet substrate incorporates friction enhancing texturing; and
   an entire multicolored image disposed on the second surface, said image having been formed using ink sublimated within said coating and said image being viewable substantially without degradation from the first surface through the thickness of the glass sheet substrate.

2. The custom imaged glass panel of claim 1 where the image receiving coating silane is a monomethyltrimethoxysilane.

3. The custom imaged glass panel of claim 2 where the image receiving coating polyurethane is a blocked polyisocyanate resin.

4. The custom imaged glass panel of claim 3 where the image receiving coating is composed of 1 part liquid thermosettable, condensation co-polymerized acidic-colloidal silica sol with monomethyltrimethoxysilanes to 3 parts blocked polyisocyanate/polyurethane epoxy resin.

5. The custom imaged glass panel of claim 4 where the image receiving coating further includes a heat stable compound selected from the group consisting of mold inhibitors, antibacterial agents, and anti-fungal compounds.

6. The custom imaged glass panel of claim 1 where the image receiving coating provides a high contrast for the sublimated image.

7. The custom imaged glass panel of claim 6 where the image receiving coating is a termixture of a) blocked polyisocyanate/polyurethane epoxy resin, b) liquid thermosettable, condensation co-polymerized acidic-colloidal silica sol with monomethyltrimethoxysilanes, and c) powdered Titanium Dioxide ($TiO_2$) in a 20:5:2 weight ratio.

8. The custom imaged glass panel of claim 7 where the image receiving coating further includes a heat stable compound selected from the group consisting of mold inhibitors, antibacterial agents, and anti-fungal compounds.

9. The custom imaged glass panel of claim 6 where the ink sublimates and the image receiving coating thermosets at a temperature of about 200° C.

10. The custom imaged glass panel of claim 1 where the ink sublimates and the image receiving coating thermosets at a temperature of about 200° C.

11. The custom imaged glass panel of claim 1 where the substrate is clear and has a thickness of at least 6.3 mm and where the first and second surfaces are evenly spaced apart in parallel planes.

12. The custom imaged glass panel of claim 1 where the first and second surfaces are substantially the same size.

13. The custom imaged glass panel of claim 1 where the image receiving coating further includes a heat stable compound selected from the group consisting of mold inhibitors, antibacterial agents, and anti-fungal compounds.

14. A process for creating a custom image on a glass substrate with a first and a second surface, comprising the steps of:

compounding a sublimatable-ink-receiving, thermosettable, coating from liquid thermosettable silica sols, silanes, polyurethanes, and epoxy resins where the sublimatable-ink-receiving, thermosettable coating sol is a condensation co-polymerized acidic-colloidal silica sol;

applying the coating on a select on one of said first and second surfaces a glass substrate of select thickness where the image receiving coating has a thickness of 2 mils and the first surface of said glass substrate incorporates friction enhancing texturing;

curing said coating;

applying a complete multicolored image on the glass substrate using sublimatable inks on the thermosettable coating; and sublimating the inks on the coated glass substrate to form an image visible through the other of said select first and second surfaces where the other surface is exposable to ambient conditions without degrading visibility of the image.

15. The process of claim 14 where the coating is applied to select one of said first and second surfaces in a substantially dust free environment.

16. The process of claim 15 where the glass substrate is a flat sheet and the coating is cured at a temperature of up to about 204° C. for a period of approximately 10 minutes.

17. The process of claim 16 where the image is selected from a group consisting of original art, artwork reproduction, graphic art, photographic image, personal artwork, and downloadable digital image producible by a dot matrix printer.

* * * * *